Oct. 5, 1965

G. E. GLYNN 3,210,112

GARDEN TOOL

Filed March 18, 1963

INVENTOR.
GEORGE E. GLYNN
BY
ATTORNEYS.

Oct. 5, 1965   G. E. GLYNN   3,210,112
GARDEN TOOL

Filed March 18, 1963   2 Sheets-Sheet 2

INVENTOR:
GEORGE E. GLYNN
BY
ATTORNEYS.

United States Patent Office 3,210,112
Patented Oct. 5, 1965

3,210,112
GARDEN TOOL
George E. Glynn, St. Louis, Mo.
(1124 Nancy Lee Drive, Louisville, Ky.)
Filed Mar. 18, 1963, Ser. No. 265,618
1 Claim. (Cl. 294—50.7)

This invention relates to tools for removing a plug from, or replacing a plug of earth in the ground, removing weeds, or transplanting plugs of sod.

One of the objects of the invention is to provide a tool which has practical utility for the above purposes and is light, convenient and selective in operation.

Another object of this invention is to provide a tool of the kind described with a manually operated ejector plunger for selectively clearing the cutting head of the plug of earth.

Another object of this invention is to provide a tool for the purposes described which is safe in that, the movable parts thereof are so arranged as to eliminate any reasonable possibility of pinched fingers even when handled in a careless or thoughtless manner.

Another object of this invention is to provide a tool with interchangeable cutting heads of different size.

The tool, according to this invention, has a straight tubular cutting head which is preferably a cylinder. The open end of the cutting head is inclined with respect to the tube to provide a cutting edge longer than the circumference of the tube. Such a cutting edge has more metal for increased durability. The diagonal edge provides also for more accurate location. With this type of cutting edge, an initial earth penetration is localized to one portion, the entry portion.

The handle for the cutting head may be an extension of the upper tubular part of the cutting head or, it may be a separate tube with a detachable connection providing for substitution of different cutting heads of different diameters. Regardless of size, however, all may have sockets to fit the same handle. Within the tubular handle is a plunger which extends beyond the handle at the upper end. A hollow grip is secured to the protruding end of the plunger. The arrangement of grip and handle is such that the hollow grip can telescope into the upper end of the handle. Contained within the grip is a coil return spring which surrounds the upper end of the plunger and seats in the hollow end of the grip. This spring is compressed between the end of the grip and a seat within the handle upper end. Movement of the grip into the handle is limited by the same seat supporting the coil spring. On the opposite end of the plunger is a foot and the handle carries a stop at its lower end against which the foot comes to rest to limit the stroke of the plunger within the handle and the movement of the grip within the handle. The lower end of the handle has a step bar for foot operation to drive the cutting head into the ground. One of the features of this invention is a step bar offset with respect to the handle so that maximum pressure can be brought to bear on the side of the cutting head having the entry cutting edge portion. This portion of the cutting head has another function, that of severing the plug when the handle is tilted.

As stated heretofore, the cutting head is a straight tube. It retains the plug after it has been cut. This feature lends utility to the tool when used to transplant or to remove weeds.

Other objects and advantages of this invention will appear from the following detailed description which is in such clear, concise and exact terms as will enable any person skilled in the art to make and use the same when taken with the accompanying drawings, forming a part thereof, and in which.

Figure 2:
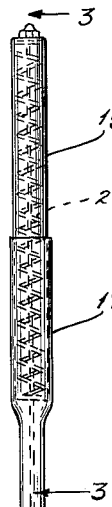
FIG. 2 is a view in front elevation of one form of the tool constructed in accordance with this invention.
Figure 3:
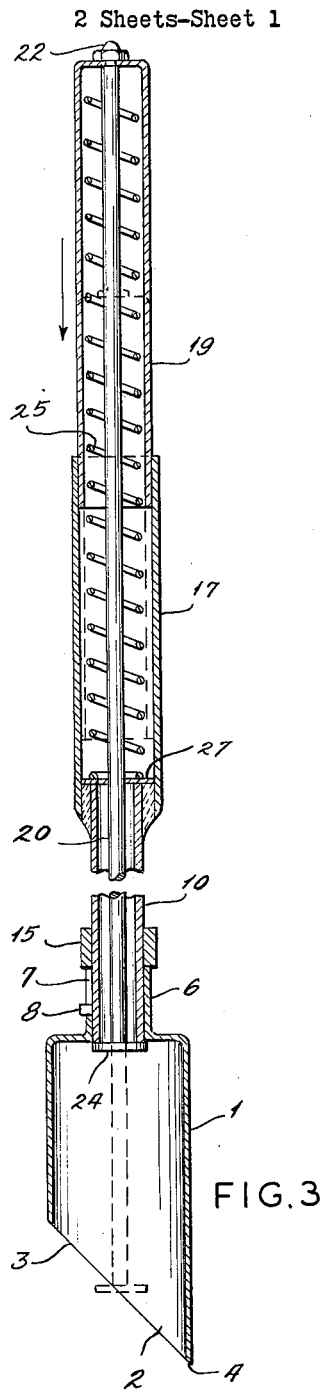
FIG. 3 is an enlarged sectional view of the tool shown in FIG. 2 taken on the lines 3—3 of FIG. 2 looking in the direction of the arrows.

Turning now to FIGS. 2 and 3, the tool, according to this invention, has a tubular cutting head 1 which is cylindrical and has an open end 2 inclined with respect to the walls of the tube 1 to provide a cutting edge 3 longer than the circumference of the cutting head 1. This construction provides a cutting edge 3 with more metal for increased durability and one which has an entry portion 4 so located as to aid in accurate or selective tool placement. The upper part of the cutting head 1 is necked down to form a socket 6. This socket has at least one bayonet type of slot 7 for receiving a pin 8 protruding from the lower end of handle 10.

Figure 4:
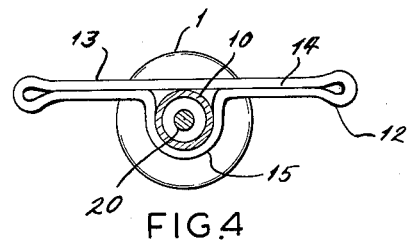
FIG. 4 is a transverse sectional view taken on the line 4—4 of FIG. 2 looking in the direction of the arrows.

The upper edge of the socket 6 abuts against the lower edge of a step bar 12. Referring to FIG. 4, the step bar 12 is a closed loop of metal flattened to provide steps 13 and 14 on opposite sides of the handle 10 and a loop 15 surrounding the handle 10 and welded in place thereon. The upper edge of the socket 6, and the upper edge defining the circumferential leg of the slot 7, are so formed as to produce a wedging action between the top of the edge of the socket 6 and the bottom of the loop 15 when the cutting head 1 is rotated on the handle 10 into the position shown in FIG. 2. This wedging effect prevents any looseness between the cutting head 1 and handle 10 and retains these parts against accidental uncoupling.

Handle 10 has a stepped portion 17 of larger diameter to slidably receive grip 19. Grip 19 can slidably telescope within the stepped portion 17 which provides a guide for this sliding movement.

Extending through the handle 10 is a plunger 20 which has a reduced threaded end projecting through a hole in the closed end of the grip 19. This end of the plunger 20 is secured in position by nut 22. On the lower end of the plunger 20 is a foot 24 held against the end of the handle 10 by a coil compression spring 25 seated at one end within the closed end of the grip 19 and at its other end of the handle 10 supports the washer 27 against the pressure of the coil spring 25.

In the structure so far described, further expansion of the coil spring 25 is prevented by the engagement between foot portion 24 and the lower end of handle 10. On the other hand, the washer 27 resting on the opposite end of the handle 10 forms a limit for downward movement of the grip 19 within the stepped portion 17. The permissible stroke of the grip is limited in the upward movement on expansion of spring 25 by the foot portion 24. Downward movement on the other hand is limited by engagement of the lower end of the grip with washer 27. Since the washer 27 is restrained from movement from the position shown in FIG. 3, it necessarily forms a guide for the plunger 20.

As has been pointed out above, it is a feature of this invention that the cutting head is held securely in position on the handle 10 by wedging action of the socket 6 between the bottom of the loop 15 and the pin 8. Foot pressure of the step bar is thus transmitted directly to the cutting head 1, freeing the handle 10 and the pin 8 of any strain. The eccentric relation between the step bar and the handle 10 and cutting head 1 reduces the twist which might be imposed on the handle 10 while the tool is being driven into the earth. Direct application of the force, where the force is necessary, permits the use of lighter weight parts especially in the handle 10. Relatively thin sections of metal are permissible in the tubular handle. When thin sections of metal are permissible in the tubular handle and bending strains eliminated, it is then possible to construct the device with a close clearance between the outside of the grip 19 and the stepped portion 17 to minimize any possibility of pinched fingers when the operator's hand on the grip encounters the upper edge of the stepped portion 17. To further guard against such an occurrence, the upper edge of the stepped portion 17 may be formed with a plastic coating over which the hand will readily slide.

Figure 1:
FIG. 1 is an environmental view to illustrate the use of a tool constructed in accordance with this invention.

Operation of the tool of the construction just described, is illustrated in FIG. 1 where the operator seizes the grip 19 in one hand and the step portion of the handle 17 in the other so as to place the entry portion 4 of the cutting edge in the proper position to cut out the plug he desires. The operator then places his foot on the step bar forcing the cutting edge into the ground. When the foot 24 engages the top of the sod, further movement of the tool into the earth is stopped. The operator then rocks the handle 10 slightly to free the plug. This rocking motion will cause the entry portion 4 to sever the plug which can then be readily removed by raising the handle in both hands. Operation of the grip 19 downwardly into the handle causes the foot 24 to eject the plug.

Figures 6, 7, 8:
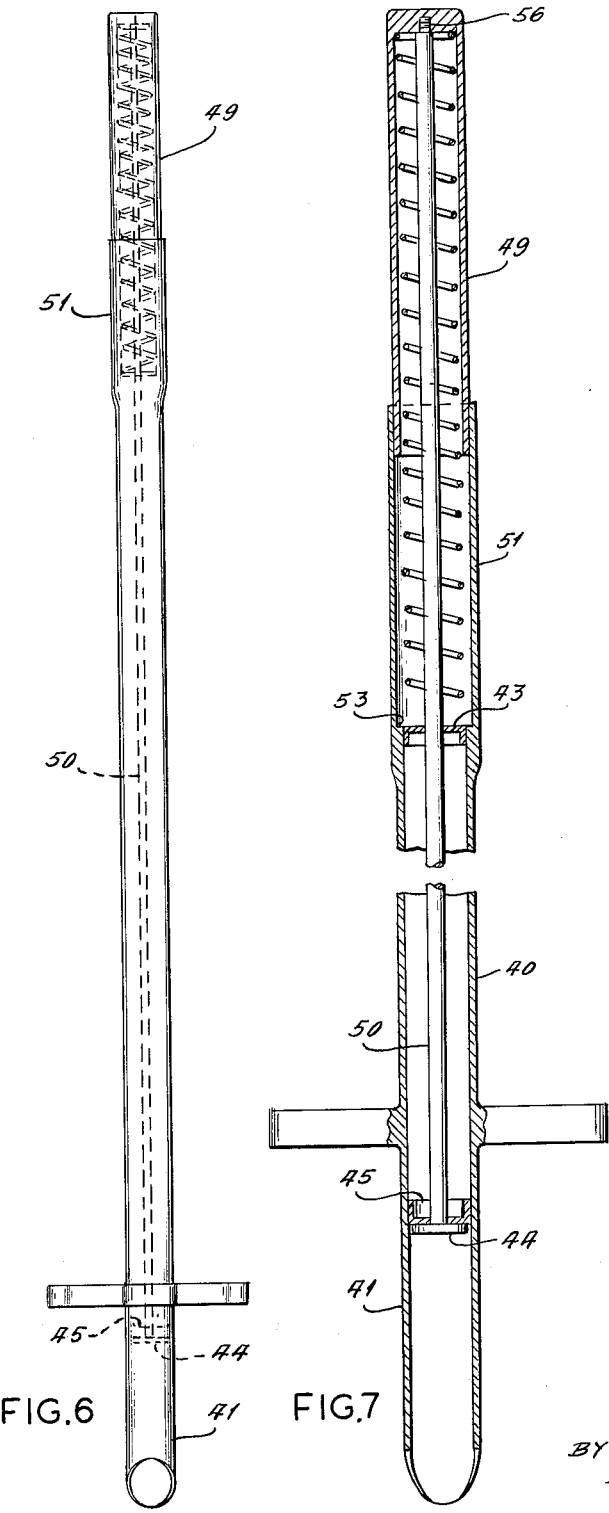
FIG. 6 is a front elevational view of a modified form of the tool shown in FIG. 2.
FIG. 7 is a fragmentary longitudinal sectional view of the tool shown in FIG. 6 on an enlarged scale.
FIG. 8 shows a modified form of grip which may be applied to any one of the tools shown heretofore.

The modification, shown in FIG. 6 and FIG. 7, is similar in many ways to that above described. This description will be limited to the differences. In this modification, the handle 40 and the cutting head 41 are portions of the same tube. Plunger 50 is guided in its sliding movement by a pair of apertured bushings 43 and 45 having a press fit within the tubular handle 40. Upward movement of the plunger 50 is limited by engagement between the foot portion 44 on the plunger 50 and bushing 45. The stepped portion 51 of the handle 40 is formed by telescoping a larger diameter tube over the end of the handle 40. When the tubes 51 and 40 are welded, there is provided a shoulder 53 adjacent the apertured bushing 43 which in turn forms a stop limiting telescoping movement of grip 49 within the stepped portion 51. Plunger 50 has a stepped end 56 threaded into the closed end of grip 49.

Figure 5:
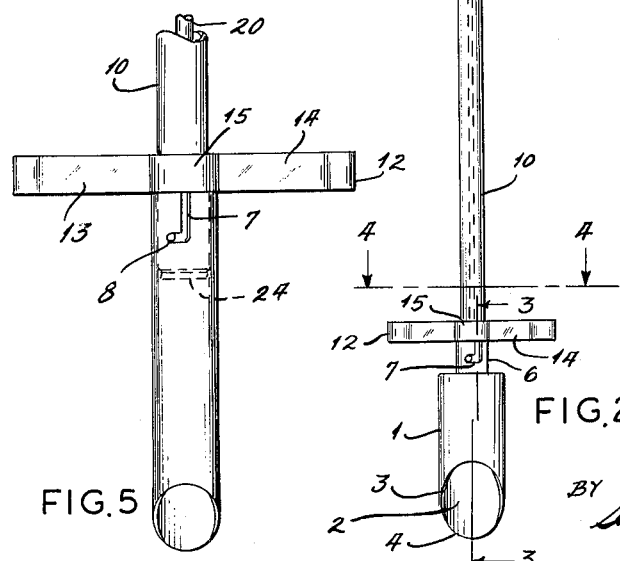
FIG. 5 is a fragmentary view of a portion of the tool shown in FIG. 2 equipped with a cutting head of smaller diameter.

The construction, shown in FIGS. 6 and 7, differs from that heretofore described in FIGS. 2 through 5 in that the cutting head is integral rather than detachable and replaceable. As shown in FIGS. 2 and 5, it is possible to provide a plurality of cutting heads for this modification.

As shown in FIG. 8, the upper end of the grips, shown in any one of the prior modifications, can be provided with a spade-like handle, such as 60.

Merely by way of illustration, and not by way of limitation, the following dimensions have been found to provide an effective tool. It is evident that other dimensions, to suit users of different heights and soils and conditions of various types, can be used. The handle 10 can be of one-half inch, O.D., pipe, four feet long. For weeding, especially for removing weeds with long thin tap roots, such as dandelions, or for producing watering or fertilizing holes, the head can be one half inch in inside diameter (just large enough to fit over the handle end), and long enough to provide one and one-half to two inches of length, inside, between the entry portion 4 and the lower face of the foot 24. The lower end of the head can be cut off at an angle of 60° to form the entry portion 4, and the entire lower edge sharpened to a cutting edge with a chamfer entirely on the outside, thus preserving the cylindrical character of the inner surface. For general purpose work, the head may have an inside diameter of three-fourths of an inch to an inch and a half, either being necked down at its upper (socket) end, or provided with a bushing or a bushed or enlarged handle.

For plugging Zoysia, Bermuda grass and the like, the head can be in the neighborhood of one and three-quarters to two inches in inside diameter and two inches from the entry portion 4 to the foot 24. The bevel angle and cutting edge chamfer can be the same as that of the weeding head.

It has been found that the relatively small diameter foot 24 (e.g., one-half inch) also works well with the large, plugger type head, but it can be seen that provision can be made for selectively attaching a larger foot when the larger head is used in the embodiment shown in FIGURES 1–5.

Other changes in and modifications of the construction described may be made without departing from the spirit of my invention or sacrificing its advantages. For example, a set screw in a threaded hole or boss in the socket 6 may be used instead of the bayonet joint, or the socket may be internally threaded and the handle end externally threaded, or some such connection can be made. A resilient member, such as a rubber or plastic ring, or a spring washer, can be mounted between the top of the socket and the bottom of the loop 15, so as to facilitate connection of the bayonet joint type socket. The materials of which the various parts are made may vary, from steel to non-ferrous metals to plastics and wood, or combinations thereof. The spring abutments, plunger guides and plunger anchoring means can all be varied. For example, stops can be spot welded inside the handle. These variations are, as has been indicated, merely illustrative of variations within the scope of the appended claims, which will occur to those skilled in the art in the light of the foregoing disclosure.

Having thus described the invention, what is claimed and desired to be secured by Letters Patent is:

A plugger-weeder comprising a hollow shaft; a hollow tubular grip mounted in a close sliding telescopic fit in and extending out of the upper end of said shaft for movement relative to said shaft; a plunger rod slidably mounted in said shaft and connected to said grip; spring means mounted in said shaft and connected to bias said grip and plunger rod in a direction away from the lower end of said shaft; a plunger piston mounted on and at the lower end of said plunger rod, said plunger piston being wider transversely than the inside diameter of the hollow shaft but at least as narrow in the same dimension as the outside diameter of said shaft, said plunger piston being normally biased by said spring means to seated position with its upper surface against the lower end of said shaft; a step bar secured to the outside of said shaft near the lower end thereof; a tubular cutting head of substantial axial length at the lower end of said shaft, said cutting head having a plunger-rod and shaft admitting opening at its upper end and a diagonal cutting edge at its lower end; means on said shaft and at the upper end of said cutting head for selectively mounting and demounting said cutting head on said shaft whereby cutting heads of various cutting diameters may be mounted on said shaft, said plunger piston being selectively movable between the upper and lower ends of said head by manipulation of said grip.

References Cited by the Examiner

UNITED STATES PATENTS

| 28,694 | 6/60 | Smith. |
| 303,474 | 8/84 | Webb. |
| 2,635,001 | 4/53 | Slinkman _____ 294—50.5 |
| 2,708,593 | 5/55 | Benoist _____ 172—22 |

FOREIGN PATENTS

| 669,987 | 8/29 | France. |
| 567,031 | 12/32 | Germany. |

M. HENSON WOOD, Jr., *Primary Examiner.*

ANDRES H. NIELSEN, SAMUEL F. COLEMAN, *Examiners.*